United States Patent
Kapoor et al.

(10) Patent No.: US 10,771,424 B2
(45) Date of Patent: Sep. 8, 2020

(54) USABILITY AND RESOURCE EFFICIENCY USING COMMENT RELEVANCE

(71) Applicant: Microsoft Technology Licensing, LLC, Redmond, WA (US)

(72) Inventors: Divye Kapoor, Sunnyvale, CA (US); Zheng Li, San Jose, CA (US); Pujita Mathur, San Francisco, CA (US); Heidi Jaywing Wang, Cupertino, CA (US); Ying Xuan, Sunnyvale, CA (US); Parinkumar Shah, Sunnyvale, CA (US); Shubham Gupta, San Mateo, CA (US); Brett Konold, Santa Clara, CA (US); Marco Varela Alvarado, San Francisco, CA (US); Chao Zhang, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 300 days.

(21) Appl. No.: 15/483,968

(22) Filed: Apr. 10, 2017

(65) Prior Publication Data

US 2018/0293278 A1 Oct. 11, 2018

(51) Int. Cl.
*G06F 7/00* (2006.01)
*H04L 12/58* (2006.01)
(Continued)

(52) U.S. Cl.
CPC .......... *H04L 51/32* (2013.01); *G06F 16/3346* (2019.01); *G06F 40/279* (2020.01);
(Continued)

(58) Field of Classification Search
CPC ... H04L 51/32; H04L 67/306; G06F 16/3346; G06F 17/2765; G06F 17/2785;
(Continued)

(56) References Cited

U.S. PATENT DOCUMENTS 9,032,289 B1 * 5/2015 Cierniak ............. G06F 16/9558
715/255
9,342,630 B2 * 5/2016 Ganesh .................. G06Q 30/02
(Continued)

*Primary Examiner* — Mohammed R Uddin
(74) *Attorney, Agent, or Firm* — Schwegman Lundberg & Woessner, P.A.

(57) ABSTRACT

Techniques for enhancing usability and electronic resource efficiency using comment relevance are disclosed herein. In some embodiments, a comment relevance system receives member feature data, including professional identity data such as professional experience or professional skill, and at least one of comment feature data and commenter feature data for comments for post on a social networking service, generates a score for each comment based on the member feature data and the comment or commenter feature data, ranks the comments based on the scores, and causes one or more of the comments to be displayed in a particular position based on the ranking. In some embodiments, the member feature data comprises professional identity data of a member of the social networking service, the comment feature data indicates at least one attribute of the comment, and the commenter feature data indicates at least one attribute of the commenter of the comment.

19 Claims, 10 Drawing Sheets

(51) Int. Cl.
*G06F 16/33* (2019.01)
*G06Q 50/00* (2012.01)
*G06F 40/30* (2020.01)
*G06F 40/279* (2020.01)
*H04L 29/08* (2006.01)

(52) U.S. Cl.
CPC ............ *G06F 40/30* (2020.01); *G06Q 50/01* (2013.01); *H04L 67/306* (2013.01)

(58) Field of Classification Search
CPC ......... G06F 17/30038; G06F 17/30752; G06F 3/04812; G06F 17/30648; G06Q 50/01
USPC ................ 707/714, 723, 727, 732, 748, 737
See application file for complete search history.

(56) References Cited

U.S. PATENT DOCUMENTS

| | | | | |
|---|---|---|---|---|
| 9,397,974 B1* | 7/2016 | Gross | .................. | H04L 51/32 |
| 9,858,317 B1* | 1/2018 | Horling | ............ | G06F 16/24578 |
| 10,013,492 B1* | 7/2018 | Petts | .................... | G09B 7/00 |
| 2001/0047290 A1* | 11/2001 | Petras | .................... | G06F 16/34 |
| | | | | 707/749 |
| 2008/0109245 A1* | 5/2008 | Gupta | ................... | G06Q 10/00 |
| | | | | 705/1.1 |
| 2010/0042577 A1* | 2/2010 | Rinearson | ............ | G06Q 10/10 |
| | | | | 706/56 |
| 2010/0262610 A1* | 10/2010 | Acosta | ................ | G06F 16/3334 |
| | | | | 707/748 |
| 2011/0231296 A1* | 9/2011 | Gross | .................... | G06Q 10/10 |
| | | | | 705/37 |
| 2011/0313987 A1* | 12/2011 | Ghosh | .................. | G06F 16/951 |
| | | | | 707/706 |
| 2012/0089616 A1* | 4/2012 | Sa'adon | ............. | G06F 16/9535 |
| | | | | 707/748 |
| 2012/0197906 A1* | 8/2012 | Landau | ................. | G06Q 10/00 |
| | | | | 707/748 |
| 2012/0278274 A1* | 11/2012 | Agrawal | ............... | G06Q 30/02 |
| | | | | 706/59 |
| 2012/0311462 A1* | 12/2012 | Devecka | ................ | H04W 4/21 |
| | | | | 715/753 |
| 2013/0031034 A1* | 1/2013 | Gubin | ............ | G06Q 10/06393 |
| | | | | 706/12 |
| 2013/0031208 A1* | 1/2013 | Linton | ..................... | G09B 7/02 |
| | | | | 709/217 |
| 2013/0054699 A1* | 2/2013 | MacAskill | ........... | G06Q 10/101 |
| | | | | 709/204 |
| 2013/0325948 A1* | 12/2013 | Chen | ....................... | G06Q 50/01 |
| | | | | 709/204 |
| 2014/0025692 A1* | 1/2014 | Pappas | ................... | G06Q 30/01 |
| | | | | 707/754 |
| 2014/0129331 A1* | 5/2014 | Spivack | ............. | G06Q 30/0269 |
| | | | | 705/14.53 |
| 2014/0172744 A1* | 6/2014 | El-Hmayssi | ....... | G06Q 30/0282 |
| | | | | 705/347 |
| 2014/0201201 A1* | 7/2014 | Song | ................... | G06F 16/9577 |
| | | | | 707/723 |
| 2014/0214960 A1* | 7/2014 | Allen | ...................... | H04L 67/22 |
| | | | | 709/204 |
| 2014/0229293 A1* | 8/2014 | Huang | ............... | G06Q 30/0273 |
| | | | | 705/14.69 |
| 2014/0245189 A1* | 8/2014 | Berger | ................. | H04L 67/306 |
| | | | | 715/753 |
| 2014/0344359 A1* | 11/2014 | Broz | ....................... | H04L 67/10 |
| | | | | 709/204 |
| 2015/0032492 A1* | 1/2015 | Ting | ............... | G06Q 10/063112 |
| | | | | 705/7.14 |
| 2015/0081500 A1* | 3/2015 | Dunne | ................... | G06Q 40/00 |
| | | | | 705/35 |
| 2015/0379120 A1* | 12/2015 | Allen | ................ | G06F 16/24578 |
| | | | | 707/723 |
| 2016/0232241 A1* | 8/2016 | Stoyanov | ............ | G06F 16/9535 |
| 2016/0292288 A1* | 10/2016 | Walton | .................. | G06F 16/335 |
| 2016/0300275 A1* | 10/2016 | Kapoor | ............... | G06F 16/2246 |
| 2016/0314507 A1* | 10/2016 | Tedjamulia | ........ | G06Q 30/0282 |
| 2017/0139920 A1* | 5/2017 | Ball | .................... | G06F 16/24578 |
| 2017/0220579 A1* | 8/2017 | Kazi | ..................... | H04L 67/306 |
| 2018/0039700 A1* | 2/2018 | Greenberger | ........... | G06K 9/18 |
| 2018/0048615 A1* | 2/2018 | Barajas Gonzalez | ... | H04L 51/12 |
| 2018/0189288 A1* | 7/2018 | Zhang | .................... | G06F 16/00 |

* cited by examiner

400

| John Doe | 410 |
| Senior Editor, LinkedIn | |

Daily Reporter: Stalked Sports Reporter Awarded $38 Million

John Doe on LinkedIn – Vindication: A jury awarded reporter Jane Smith $38 million in her civil lawsuit against a stalker and the hotel ...

Like – Comment – Share – 👍487 – 💬73

Show previous comments    420    Sort by: Chronology ▽    430

Jennifer Wilkerson – Jim Law, you would not want to tolerate that especially if the stalker is capable of violence towards you. The hotel industry is big business and hotels ... show more    8h    422

John Moore – ☆☆☆☆☆☆☆    7h

Gary Small – Is anyone going to the festival in downtown this weekend?    7h

Scott Ruddy – Good for her! Now on to learning lessons on how to avoid such an incident in the future.    6h Danielle Catling – I don't know why people continue to blame the victim, like it is her fault that someone was stalking her!    4h Rosalind McDougal – I don't believe that the hotel should have been held responsible for someone who was not an employee. I would appeal the award. It is terrible what has ... show more    1h Helen Wong – Good for her!!!    1h Add a comment ...

*FIG. 4A*

FIG. 4B

USABILITY AND RESOURCE EFFICIENCY USING COMMENT RELEVANCE

TECHNICAL FIELD

The present application relates generally to information retrieval and, in one specific example, to methods and systems of enhancing usability and electronic resource efficiency of a networked site using comment relevance.

BACKGROUND

Networked services, such as social networking services, often allow members to publish content. Other members can then submit comments to be published in association with the published content. A particular member will often be forced to navigate through irrelevant, or otherwise low quality, comments in order to find the comments that are relevant to him or her. Such inefficiency can lead to technical problems. For example, displaying irrelevant comments to a user before comments that are relevant to the user is a waste of real estate on the screen of the computing device on which the comments are displayed, which is especially troublesome for use cases involving a smartphone or other mobile device with a small screen size. As another example, displaying irrelevant comments to a user leads to undesirable consumption of electronic resources, such as bandwidth, power of the computing device on which the comments are displayed, and processor workload of the computing device on which the comments are displayed. Other technical problems from displaying irrelevant comments can arise as well.

BRIEF DESCRIPTION OF THE DRAWINGS

Some embodiments of the present disclosure are illustrated by way of example and not limitation in the figures of the accompanying drawings, in which like reference numbers indicate similar elements.

FIGS. 4A and 4B illustrate a graphical user interface (GUI) displaying comments for an online post, in accordance with an example embodiment.

DETAILED DESCRIPTION

Figure 1:
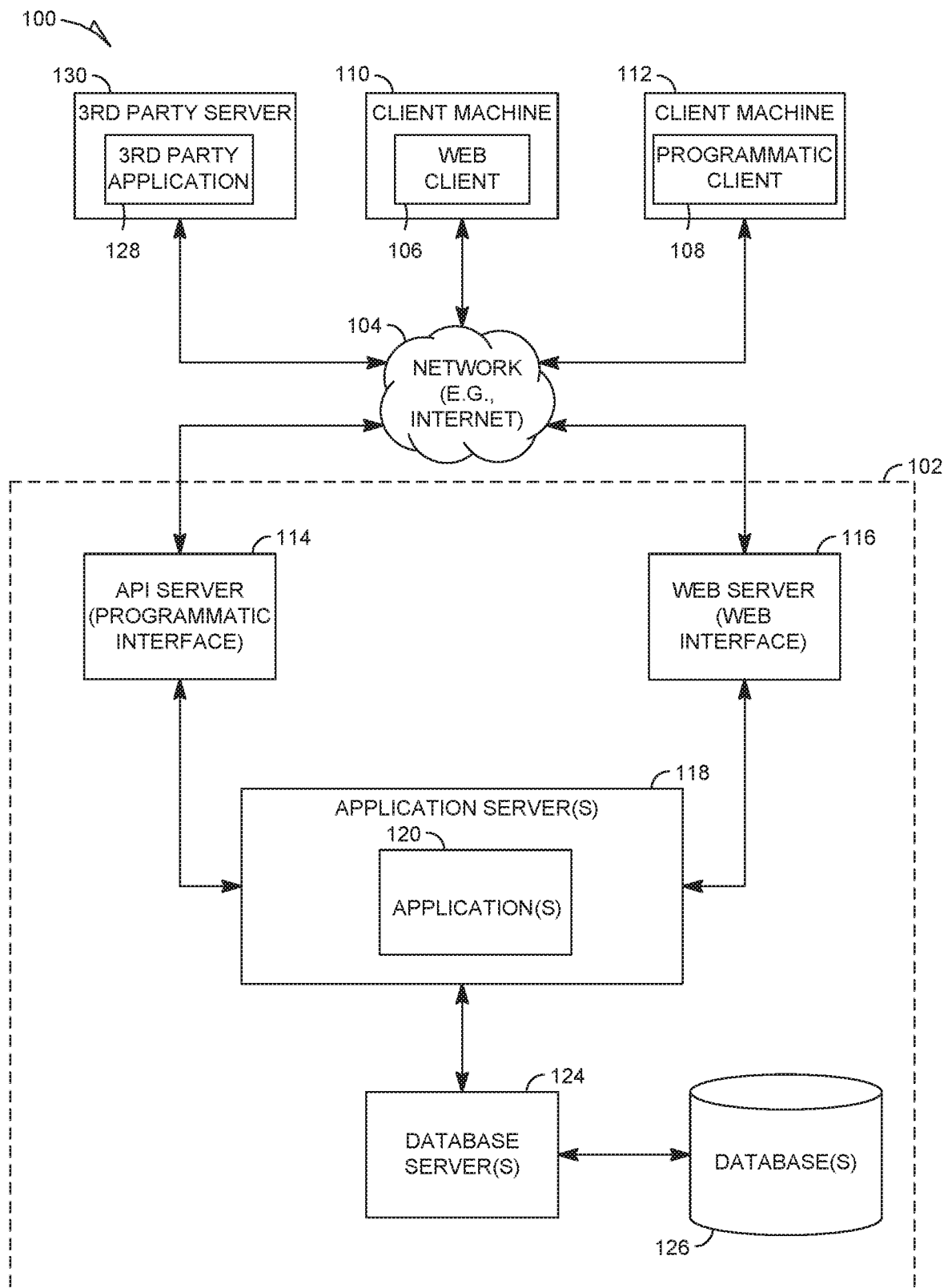
FIG. 1 is a block diagram illustrating a client-server system, in accordance with an example embodiment.

Example methods and systems of enhancing usability and electronic resource efficiency using comment relevance are disclosed. In the following description, for purposes of explanation, numerous specific details are set forth in order to provide a thorough understanding of example embodiments. It will be evident, however, to one skilled in the art that the present embodiments may be practiced without these specific details.

The present disclosure provides example embodiments in which usability and electronic resource efficiency of a networked site are enhanced by using comment relevance in determining the presentation of comments on the networked site. In some example embodiments, operations are performed by a machine having a memory and at least one hardware processor, with the operations comprising: for each one of a plurality of comments for an online post on a social networking service, receiving corresponding member feature data and at least one of corresponding comment feature data and corresponding commenter feature data, each one of the plurality of comments having been authored by a corresponding commenter, the member feature data comprising professional identity data of a member of the social networking service, the professional identity data indicating at least one of a professional experience of the member and a professional skill of the member, the comment feature data indicating at least one attribute of the corresponding one of the plurality of comments, and the commenter feature data indicating at least one attribute of the corresponding commenter of the corresponding one of the plurality of comments; for each one of the plurality of comments, generating a corresponding score based on the corresponding member feature data and the at least one of the corresponding comment feature data and the corresponding commenter feature data; ranking the plurality of comments based on the generated scores; and causing at least one of the plurality of comments to be displayed in a particular position in a user interface of a computing device of the member based on the ranking of the at least one of the plurality of comments.

In some example embodiments, prior to the generating of the corresponding scores for each one of the plurality of comments, a joined set of features is formed, with the joined set of features including the at least one of the corresponding comment feature data and the corresponding commenter feature data, and the generating of the corresponding scores comprises generating a corresponding score based on the corresponding member feature data and the joined set of features.

In some example embodiments, the causing the at least one of the plurality of comments to be displayed in a particular position comprises causing the plurality of comments to be displayed in an order corresponding to the ranking of the plurality of comments.

In some example embodiments, the at least one of the corresponding comment feature data and corresponding commenter feature data comprises the corresponding commenter feature data, the corresponding commenter feature data comprising professional identity data of the corresponding commenter of the one of the plurality of comments, and the corresponding score for each one of the plurality of comments is generated based on a level of similarity between the professional identity data of the member and professional identity data of the corresponding commenter of the one of the plurality of comments.

In some example embodiments, the at least one of the corresponding comment feature data and corresponding commenter feature data comprises the corresponding comment feature data, the corresponding comment feature data comprising at least one word in the corresponding one of the plurality of comments, and the generating the corresponding score for each one of the plurality of comments comprises: for each one of the plurality of comments, determining a corresponding level of relevancy of the corresponding one of the plurality of comments to the professional identity data of the member based on the at least one word in the corresponding one of the plurality of comments; and for each one of the plurality of comments, generating the corresponding score based on the determined corresponding level of relevancy of the corresponding one of the plurality of comments.

In some example embodiments, the professional identity data is retrieved from a profile of the member stored on the social networking service.

In some example embodiments, the at least one of the corresponding comment feature data and corresponding commenter feature data comprises the corresponding comment feature data, the corresponding commenter feature data comprising a number of user selections to view the corresponding one of the plurality of comments.

In some example embodiments, the at least one of the corresponding comment feature data and corresponding commenter feature data comprises the corresponding commenter feature data, the corresponding commenter feature data comprising a level of network relationship between the member and the corresponding commenter of the corresponding one of the plurality of comments.

In some example embodiments, the at least one of the corresponding comment feature data and corresponding commenter feature data comprises the corresponding comment feature data, the corresponding comment feature data comprising a length of the corresponding one of the plurality of comments.

In some example embodiments, the at least one of the corresponding comment feature data and corresponding commenter feature data comprises the corresponding comment feature data, the corresponding comment feature data comprising a number of explicit user responses to the corresponding one of the plurality of comments.

In some example embodiments, the at least one of the corresponding comment feature data and corresponding commenter feature data comprises the corresponding commenter feature data, the corresponding commenter feature data comprising a status of the corresponding commenter of the corresponding one of the plurality of comments.

In some example embodiments, the at least one of the corresponding comment feature data and corresponding commenter feature data comprises the corresponding commenter feature data, the corresponding commenter feature data comprising an indication of popularity of the corresponding commenter of the corresponding one of the plurality of comments.

In some example embodiments, the at least one of the corresponding comment feature data and corresponding commenter feature data comprises the corresponding commenter feature data, the corresponding commenter feature data comprising a level of interaction on the social networking service between the member and the corresponding commenter of the corresponding one of the plurality of comments.

In some example embodiments, the generating the corresponding score comprises calculating the corresponding score using a corresponding weight for each one of the corresponding member feature data and the at least one of the corresponding comment feature data and the corresponding commenter feature data.

In some example embodiments, the operations further comprise: causing a selectable user interface element to be displayed in association with the online post in the user interface of the computing device; and receiving a user selection of the selectable user interface element, the user selection indicating a request that the plurality of comments be sorted and displayed according to relevance, wherein the causing the at least one of the plurality of comments to be displayed in a particular position in a user interface of a computing device of the member based on the ranking of the at least one of the plurality of comments is performed based on the receiving of the user selection.

In some example embodiments, the operations further comprise: for each one of a plurality of online posts, generating a corresponding score based on corresponding scores of comments of the online post, the plurality of online posts comprising the online post; ranking the plurality of online posts based on the generated scores of the online posts; and causing at least one of the plurality of online posts to be displayed in a particular position in the user interface of the computing device of the member based on the ranking of the at least one of the plurality of online posts.

In some example embodiments, the operations further comprise: analyzing content of the plurality of comments; determining that the content of one of the plurality of comments belongs to one of a plurality of classifications based on the analysis of the content of the plurality of comments; and preventing the one of the plurality of comments from being displayed based on the determining that the content of the one of the plurality of comments belongs to the one of the plurality of classification.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
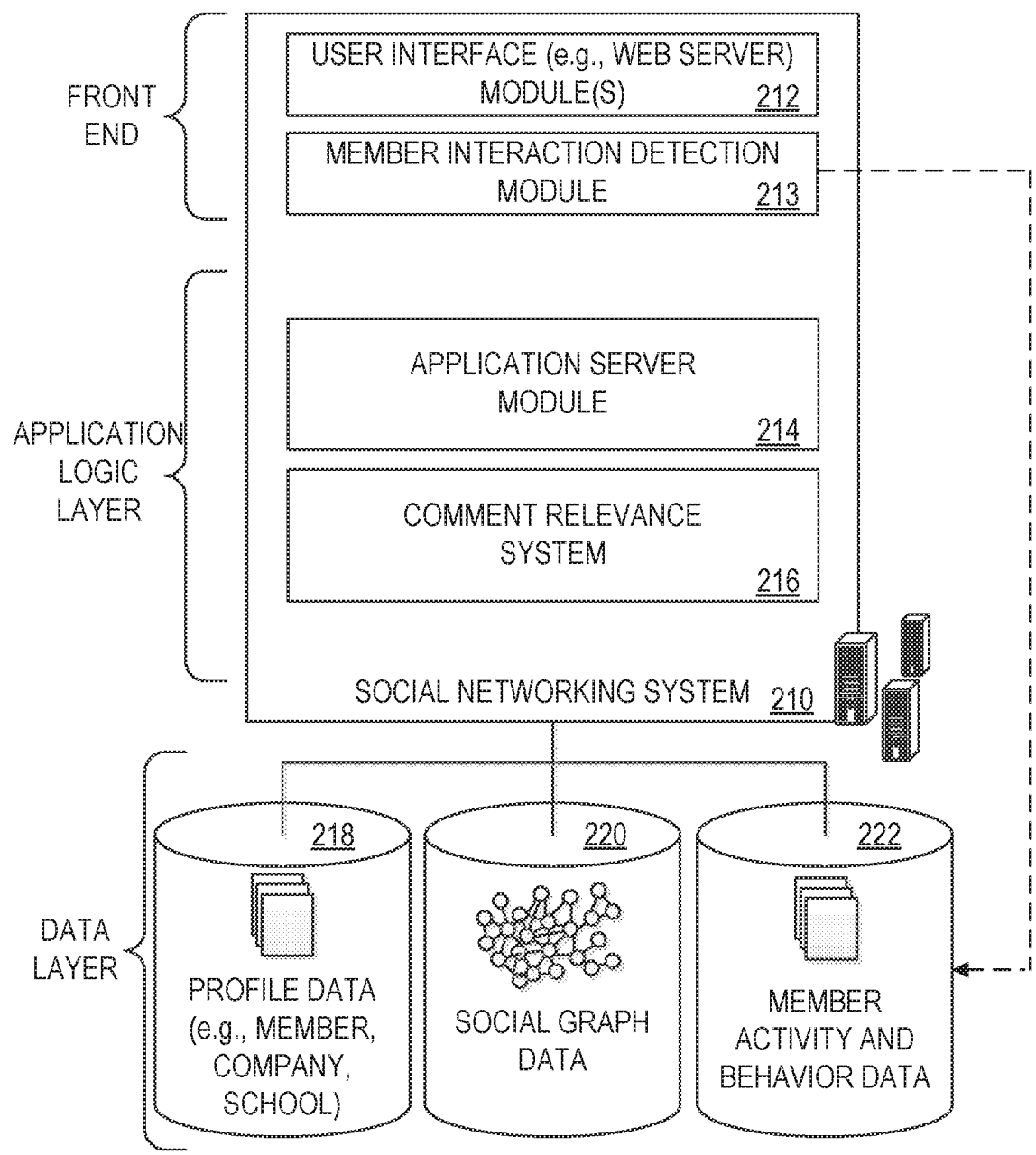
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as comment relevance system 216, for use in social networking system 210, consistent with some embodiments of the present disclosure. In some embodiments, the comment relevance system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the comment relevance system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the comment relevance system 216.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the comment relevance system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
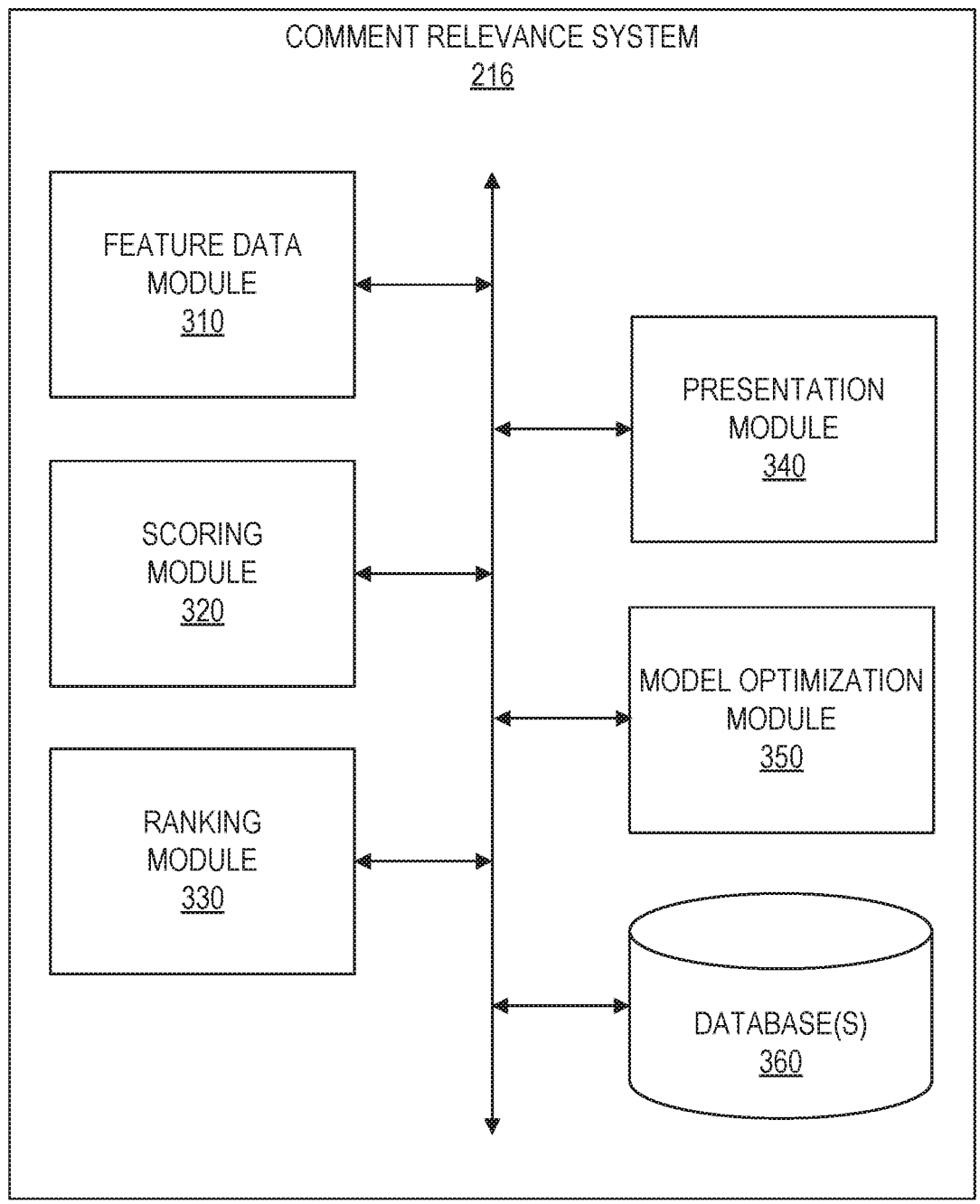
FIG. 3 is a block diagram illustrating components of a comment relevance system, in accordance with an example embodiment.

FIG. 3 is a block diagram illustrating components of the comment relevance system 216, in accordance with an example embodiment. In some embodiments, the comment relevance system 216 comprises any combination of one or more of a feature data module 310, a scoring module 320, a ranking module 330, a presentation module 340, a model optimization module 350, and one or more database(s) 360. The modules 310, 320, 330, 340, and 350 and the database(s) 360 can reside on a machine having a memory and at least one processor (not shown). In some embodiments, the modules 310, 320, 330, 340, and 350 and the database(s) 360 can be incorporated into the application server(s) 118 in FIG. 1. In some example embodiments, the database(s) 360 is incorporated into database(s) 126 in FIG. 1 and can include any combination of one or more of databases 218, 220, and 222 in FIG. 2. However, it is contemplated that other configurations of the modules 310, 320, 330, 340, and 350, as well as the database(s) 360, are also within the scope of the present disclosure.

In some example embodiments, one or more of the modules 310, 320, 330, 340, and 350 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310, 320, 330, 340, and 350 is configured to receive user input. For example, one or more of the modules 310, 320, 330, 340, and 350 can present one or more GUI elements (e.g., drop-down menu, selectable buttons, text field) with which a user can submit input.

In some example embodiments, one or more of the modules 310, 320, 330, 340, and 350 is configured to perform various communication functions to facilitate the functionality described herein, such as by communicating with the social networking system 210 via the network 104 using a wired or wireless connection. Any combination of one or more of the modules 310, 320, 330, 340, and 350 may also provide various web services or functions, such as retrieving information from the third party servers 130 and the social networking system 210. Information retrieved by the any of the modules 310, 320, 330, 340, and 350 may include profile data corresponding to users and members of the social networking service of the social networking system 210.

Additionally, any combination of one or more of the modules 310, 320, 330, 340, and 350 can provide various data functionality, such as exchanging information with database(s) 360 or servers. For example, any of the modules 310, 320, 330, 340, and 350 can access member profiles that include profile data from the database(s) 360, as well as extract attributes and/or characteristics from the profile data of member profiles. Furthermore, the one or more of the modules 310, 320, 330, 340, and 350 can access social graph data and member activity and behavior data from database(s) 360, as well as exchange information with third party servers 130, client machines 110, 112, and other sources of information.

In some example embodiments, feature data module 310 is configured to retrieve, or otherwise receive, corresponding feature data for each one of a plurality of comments for an online post on a social networking service (e.g., the social networking service of FIG. 2 implemented by social networking system 210). An online post may comprise any content published on a networked site, such as content published by a member of a social networking site on the social networking site. Such content may include, but is not limited to, text, copies of documents, links to documents, images, videos, or any combination thereof. In some example embodiments, a post is displayed in a feed of content that is presented to a user of the networked site on which the post is published, such as to a member of a social networking site. Such content feeds may be personalized for the specific user to which they are being presented. For example, the selection of content in a feed may be determined based on information about the specific user, such as profile data (e.g., from database 218 in FIG. 2), social graph data (e.g., from database 220 in FIG. 2), and member activity and behavior data (e.g., from database 222 in FIG. 2). Users of the networked site on which a post is published may respond to the post by publishing content in the form of a comment. In some example embodiments, a comment is published as part of a thread of messages or other content. The author of a comment may be referred to herein as the "commenter" of the comment.

In some example embodiments, the feature data received by the feature data module 310 comprises member feature data, comment feature data, or commenter feature data, or any combination thereof. It is contemplated that other types of feature data are also within the scope of the present disclosure. In some example embodiments, the feature data comprises profile data (e.g., from database 218 in FIG. 2), social graph data (e.g., from database 220 in FIG. 2), or member activity and behavior data (e.g., from database 222 in FIG. 2), or any combination thereof.

Member feature data comprises any information about the user who is using the networked site and for whom a determination is being made as to what content to display (e.g., which posts and/or comments to display to the user). In some example embodiments, the member feature data comprises professional identity data indicating one or more professional experiences of the user, such as the employment history of the user, or one or more professional skills of the member, or a combination thereof. For example, the professional identity data of a user may identify the user as currently working as an attorney and being skilled in the areas of patents, patent prosecution, intellectual property, and licensing. Such professional identity data may be retrieved from profile data of the user (e.g., profile data stored in database 218 in FIG. 2). The member feature data may comprise other types of profile data, including, but not limited to, demographic information and identified interests of the user. In some example embodiments, the member feature data is compared with attributes of the comment or the commenter or both to determine how relevant the comment is to the user to whom the member feature data corresponds. For example, if the member feature data indicates that the user is an attorney skilled in the area of patents, the comment relevance system 216 may use this information to determine that a comment about patent law or a comment by a commenter who is also an attorney is relevant to the user based on the similarity of comment or commenter with the member feature data of the user.

In some example embodiments, the comment feature data comprises at least one attribute of the comment that is being considered by the comment relevance system 216 for display to the user. The comment feature data may comprise a number of user selections to view the comment, how long the comment has been viewed by users, one or more words in the comment, a semantic analysis of the comment, a length of the comment, or a number of explicit user responses to the comment, or any combination thereof.

The number of user selections to view the comment represents how many users have viewed the comment. In some example embodiments, the comment relevance system 216 interprets the number of user selections to view the comment as having a direct relationship to the level of relevancy of the comment (e.g., the more views of the comment, the higher the relevancy of the comment). The number of user selections to view the comment may be sampled for a specified period of time (e.g., the last 30 days).

The length of time the comment has been viewed may comprise an average time over a specified period that users spend viewing the comment (e.g., an average of 30 seconds). As with the number of user selection to view the comment, the comment relevance system 216 may interpret the length of time the comment has been viewed as having a direct relationship to the level of relevancy of the comment (e.g., the more time spent viewing the comment, the higher the relevancy of the comment).

The words of the comment may be compared by the comment relevance system 216 with the member feature data to determine how relevant the comment is to the user. In some example embodiment, the comment relevance system 216 compares the words in the comment with one or more words of the member feature data. For example, if the user's member feature data indicates that the user is a patent attorney and the comment includes the word "patent," then the comment relevance system 216 may identify the comment as being particularly relevant to the user based on the matching of terms.

In some example embodiments, a semantic analysis of the comment is performed by the comment relevance system 216 and the results of the semantic analysis may be compared with the member feature data of the user, similar to the words of the comment being compared with the member feature data. Such semantic analysis may comprise natural language processing of the comment to determined its meaning, which may then be compared with the member feature data of the user to determine the level of relevancy of the comment to the user.

In some example embodiments, the comment relevance system 216 employs one or more thresholds or standards for the length of the comment in determining the level of relevancy of the comment. For example, the comment relevance system 216 may use a minimum length threshold, determining that any comment having fewer than a predetermined minimum number of words has a low level of relevancy (e.g., a comment that merely reads "Nice!"). Additionally or alternatively, the comment relevance system 216 may use a maximum length threshold, determining that any comment having more than a predetermined maximum number of words has a low level of relevancy (e.g., a comment that goes on for far too long).

In some example embodiments, the comment relevance system 216 is configured to prevent one or more of the plurality of comments from being displayed by filtering the comment(s) out based on a determination that the comment(s) is of low quality. Such a determination of low quality may be made by the comment relevance system 216 analyzing the content of each comment to determine whether it belongs to one or more classifications of content that should be filtered out from display. Such classifications may include, but are not limited to, comments that are self-boosting (e.g., the author of an online post or a comment submits a comment or other content, such as a like, in order to make the online post or comment appear to be of higher value), comments that link to other comments that are determined to be of low quality or low relevance, comments that are determined to be spam, comments that are associated with inappropriate adult-oriented content, comments that are associated with gambling, comments that include are advertising a job opening or soliciting a job opportunity, comments that contain profanity, comments that are duplicates of other comments, comments that are identified as spam, comments that are identified as promotion, comments that include a puzzle, comments that include threats of violence, comments that are determined to comprise malware, comments that are determined to include a copyright violation, comment that include audio that is determined to be of low quality, and comments that are determined to include hate speech. It is contemplated that other classifications are within the scope of the present disclosure.

In some example embodiments, the comment relevance system 216 employs text analysis, image analysis, or link analysis, or any combination thereof, to determine what classification, if any, applies to a comment. Text analysis may include, among other things, determining the number of nouns, verbs, and/or adjectives in a comment, and making a determination about the quality of the comment based on the number of such grammatical components with respect to one another and/or with respect to the total number of words in the entire comment. For example, the comment relevance system 216 may interpret certain ratios of certain grammatical components with respect to one another and/or with respect to the total number of words as being indicative of a low quality comment.

Link analysis may comprise, among other things, crawling a link that is included in the comment to determine if the content resulting from the selection of the link is of low quality, such as if the content resulting from the link fits into one of the classifications, such as spam or inappropriate adult-oriented content.

In some example embodiments, the comment relevance system 216 interprets the number of explicit user responses to the comment as having a direct relationship to the level of relevancy of the comment (e.g., the more explicit responses to the comment, the higher the relevancy of the comment). The number of explicit responses to the comment may be sampled for a specified period of time (e.g., the last 30 days). Explicit user responses comprise actions taken by users to express their opinions regarding the comment. Examples of such explicit user responses include, but are not limited to, "likes" of the comment and comments submitted for the comment.

It is contemplated that other types of comment feature data are also within the scope of the present disclosure.

In some example embodiments, the commenter feature data comprises at least one attribute of the commenter of the comment. The commenter feature data may comprise professional identity data of the commenter (e.g., employment history, skills, etc.), a level of network relationship between the user for whom the comment is being considered for display and the commenter of the comment, a status of the commenter, an indication of popularity of the commenter, or a level of interaction on a social networking service between the user for whom the comment is being considered for display and the commenter of the comment, or any combination thereof.

In some example embodiments, the comment relevance system 216 compares the professional identity data of the user for whom the comment is being considered for display with the professional identity data of the commenter of the comment to determine the level of similarity between the two, interpreting the higher the level of similarity, the higher the relevance of the comment.

In some example embodiments, the level of network relationship between the user and the commenter comprises a level of connection between the two. In some social networking services, the basic type of connection is a contact the user knows personally and who the user trusts on a professional level. Once the user has "connected" to them on the social networking service, the contact is considered a 1st-degree connection. The user may also have an extended network of connections made up of people that the user's connections know. The user may have a social network made up of your 1st-degree, 2nd-degree, 3rd-degree connections, and so on. A 2nd-degree connection is someone who is connected to one of the user's 1st-degree connections, a 3rd-degree connection is someone who is connected to one of the user's 2nd-degree connections, and so on and so forth. In some example embodiments, the comment relevance system 216 interprets the closer the level of connection between user and the commenter, the higher the level of relevancy of the comment of the commenter to the user. In some example embodiments, the comment relevance system 216 is not only configured to determine connections between different users based on explicit identification of such connections in social graph data (e.g., social graph data in database 220), but is also configured to infer connections between users based on certain data. The data used to infer connections may include, but is not limited to, identification of users from another user's address book or contact list, a match or similarity in geolocations of users, a match or similarity in an organization (e.g., company) to which the users belong, and interactions between two specific users (e.g., this specific user viewed the profile page of another specific user). It is contemplated that other data may also be used to infer a connection between users.

A status of the commenter may comprise an indication of the commenter being at an elevated level on the networked site or within an organization. For example, if a commenter has the status of "influencer," then the comment relevance system 216 may interpret the comments of that commenter to have higher relevance than if the commenter did not have the status of "influencer" based on the elevated level of the commenter on the networked site. As another example, certain positions within an organization, such as Chief Executive Officer, may be interpreted by the comment relevance system 216 to have higher relevance than other positions.

In some example embodiments, the comment relevance system 216 interprets the level of popularity of the commenter as having a direct relationship with the level of relevancy of the comment of the commenter, such that the higher the level of popularity of the commenter, the higher then level of relevancy of the comment of the commenter. Indications of popularity that may be taken into consideration in determining the level of popularity of a commenter include, but are not limited to, the number of views of the profile page of the commenter within a specified period of time (e.g., within the last 90 days).

In some example embodiments, the comment relevance system 216 interprets the level of interaction on the social networking service between the user for whom the comment is being considered for display and the commenter of the comment as having a direct relationship with the level of relevancy of the comment to the user, such that the higher the level of interaction, the higher the level of relevancy. The comment relevancy system 216 may determine this level of interaction based on the number of interactions on the social networking service between the user and the commenter, including, but not limited to, the number of messages sent from one to the other, the number of likes submitted from one to the other, and the number of comments submitted from one to the post of the other. It is contemplated that the comment relevance system 216 may take into account other types of interactions as well in determining the level of interaction on the social networking service between the user and the commenter.

Other types of commenter feature data are also within the scope of the present disclosure.

In some example embodiments, the scoring module 320 is configured to generate a score for the comment based on the feature data for the comment. In some example embodiments, the feature data used to generate the score comprises the member feature data and at least one of the comment feature data and the commenter feature data. In generating the score for the comment, the scoring module 320 may compare the member feature data with the comment feature data and/or the commenter feature data, such as in the examples previously discussed. For example, the scoring module 320 may calculate the score based on a level of similarity between the professional identity data of the user for which the comment is being considered for display and professional identity data of the commenter of the comment.

In some example embodiments, the scoring module 320 is configured to calculate the score for a comment using a corresponding weight for each one of the feature data for the comment. For example, the scoring module 320 may apply weights $w_1 \ldots w_n$ to feature data $fd_1 \ldots fd_n$, respectively, as follows, in calculating the score for each comment in a plurality of comments for an online post:

$$\text{score} = (w_1 \times fd_1) + \ldots + (w_n \times fd_n).$$

As previously discussed, feature data $fd_1 \ldots fd_n$ may comprise any combination of member feature data, comment feature data, and commenter feature data. In some example embodiments, the scoring module 320 uses a scoring model to evaluate the feature data $fd_1 \ldots fd_n$ in calculating the score, determining how to interpret the feature data $fd_1 \ldots fd_n$, such as whether a certain feature should have a positive impact on the score or a negative impact on the score and to what degree in either direction. For certain types of feature data, the scoring model may employ a binary evaluation for the feature data, such as a determination of whether or not a certain condition exists (e.g., is the commenter an influencer), while for other types of feature data, the scoring model may employ a graduated evaluation for the feature data, such as a determination of how much of a certain condition exists (e.g., the total number of user selections to view the comment). The scoring model may use the weights according to these different evaluation approaches.

In some example embodiments, a combination of two or more features (e.g., the combination or co-occurrence of $fd_1$ and $fd_2$) can have a single weight applied to the combination (e.g., $w_1 \times (fd_1 + fd_2)$) in generating a score.

In some example embodiments, the ranking module 330 is configured to rank the comments for the online post based on their corresponding generated scores. For example, the ranking module 330 may interpret the scores to have a direct correlation with the level of relevancy of the comments to which they correspond, thereby ranking the comments in order from highest score to lowest score (e.g., highest level of relevancy to lowest level of relevancy).

In some example embodiments, the presentation module 340 is configured to cause at least one of the comments for the online post to be displayed in a particular position in a user interface of a computing device of the member (e.g., the member for which the comments were scored and ranked) based on the ranking of the comment(s).

Figure 4B:
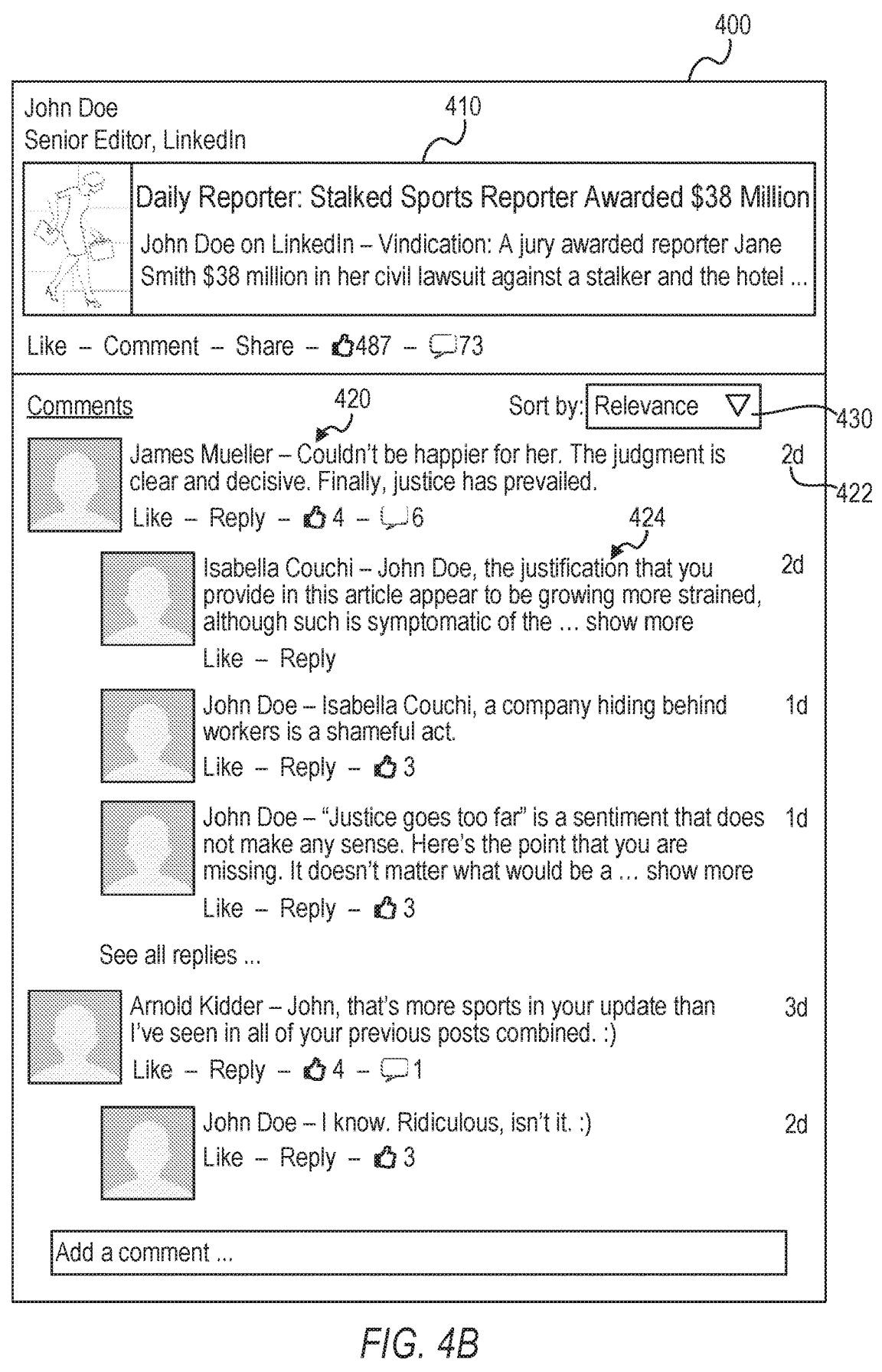

In some example embodiments, the presentation module 340 causes the plurality of comments for which scores were generated, or a portion of those plurality of comments, to be displayed in an order corresponding to the ranking of the plurality of comments. FIGS. 4A and 4B illustrate a graphical user interface (GUI) 400 of a computing device (e.g., a smartphone) displaying comments 420 for an online post 410, in accordance with an example embodiment. Each comment 420 may be displayed along with the time data 422 indicating the time the corresponding comment was submitted or published (e.g., 8 hours ago). In the example shown in FIG. 4A, the online post comprises an article ("Daily Reporter: Stalked Sports Reporter Awarded $38 Million") for which a plurality of comments 420 have been submitted by commenters. In FIG. 4A, the comments 420 are shown being displayed in chronological order (e.g., based on the time each comment was submitted or published).

However, in basing the display of comments solely on chronological order without consideration of their relevance to the user for whom they are being displayed may cause problems. Therefore, in some example embodiments, the presentation module 340 is configured to display the comments 420 in particular positions based on their level of relevancy, which may be determined by their corresponding scores generated by the scoring module 320 and their corresponding ranking generated by the ranking module 330. The presentation module 430 may display a selectable user interface element 430 in association with the online post 410 in the user interface 400 of the computing device, thereby enabling the user to select the sorting method for displaying the comments 420. In FIG. 4A, the selectable user interface element 430 has been set to sort the comments in chronological order. As seen in FIG. 4B, the user may select to have the comments 420 displayed in order of relevancy by selecting the appropriate option (e.g., "Relevance" in FIG. 4B) in the selectable user interface element 430. As a result of such a user selection, the comments 420 are displayed in descending order of their relevance, with the comment 420 having the highest level of relevance being displayed at the top of the list of comments. The levels of relevance may be determined based on the generated scores and ranking of the comments 420. As seen in FIG. 4B, when the comments 420 are sorted by relevance, older comments may be given higher priority in display position (e.g., closer to the top of the user interface 400) than newer comments due to the older comments having higher relevancy scores. For example, a comment that is two days old may be given priority in the display (e.g., a higher display position in the user interface) over a comment that is only 2 hours old.

Users may submit or publish sub-comments 424 in response to comments 420 of the online post 410. In some example embodiments, sub-comments 424 are scored in the same manner as described herein for comments 420, and the relevancy scores of sub-comments 424 are used as a factor in calculating the relevancy scores of their corresponding comments 420. For example, a comment 420 may receive a boost in its relevancy score based on the comment 420 having one or more sub-comments 424 that have high relevancy scores. Sub-comments 424 for a comment 420 may also be displayed based on their level of relevancy, such that an older sub-comment 424 may be given priority in being displayed in the list of sub-comments 424 over a newer sub-comment 424 for the same comment 424 based on the older sub-comment 424 having a higher relevancy score.

Similarly, in some example embodiments, the comment relevance system 216 is also configured to determine the level of relevance of a plurality of online posts 410 based on the relevancy scores of the comments 420 of each online post 410. As a result, an older online post 410 may be given priority in being displayed in the user interface 400 over a newer online post 410 based on the older online post 410 having one or more comments (e.g., comments 420 and/or sub-comments 424) with a relatively high relevancy score compared to the newer online post 410.

In some example embodiments, for each one of a plurality of online posts 410, the scoring module 320 generates a corresponding score based on corresponding scores of comments 420 and/or sub-comments 424 of the online post 410, the ranking module 330 ranks the plurality of online posts 410 based on the generated scores of the online posts 410, and the presentation module 340 causes at least one of the plurality of online posts 410 to be displayed in a particular position in the user interface 400 of a computing device of the user for which the online posts are being considered for display based on the ranking of the plurality of online posts 410.

In some example embodiments, the weights $w_1 \ldots w_n$ and the feature data $fd_1 \ldots fd_n$ used in the generation of the scores are determined by model optimization module 350.

The model optimization module 350 is configured to modify the weights and/or the feature data based on a machine learning process that uses user activity data, such as member activity and behavior data in database 222, in determining how users or a particular user is responding to the display configuration of the comments 420 and sub-comments 424, which display configuration is based on the scores and rankings dictated by the model. In some example embodiments, the model is trained offline to modify the weights and/or feature data, and then the model optimization module 350 updates the feature data module 310, the scoring module 320, the ranking module 330, and the presentation module 340 accordingly to reflect the modification of the model.

Figure 5:
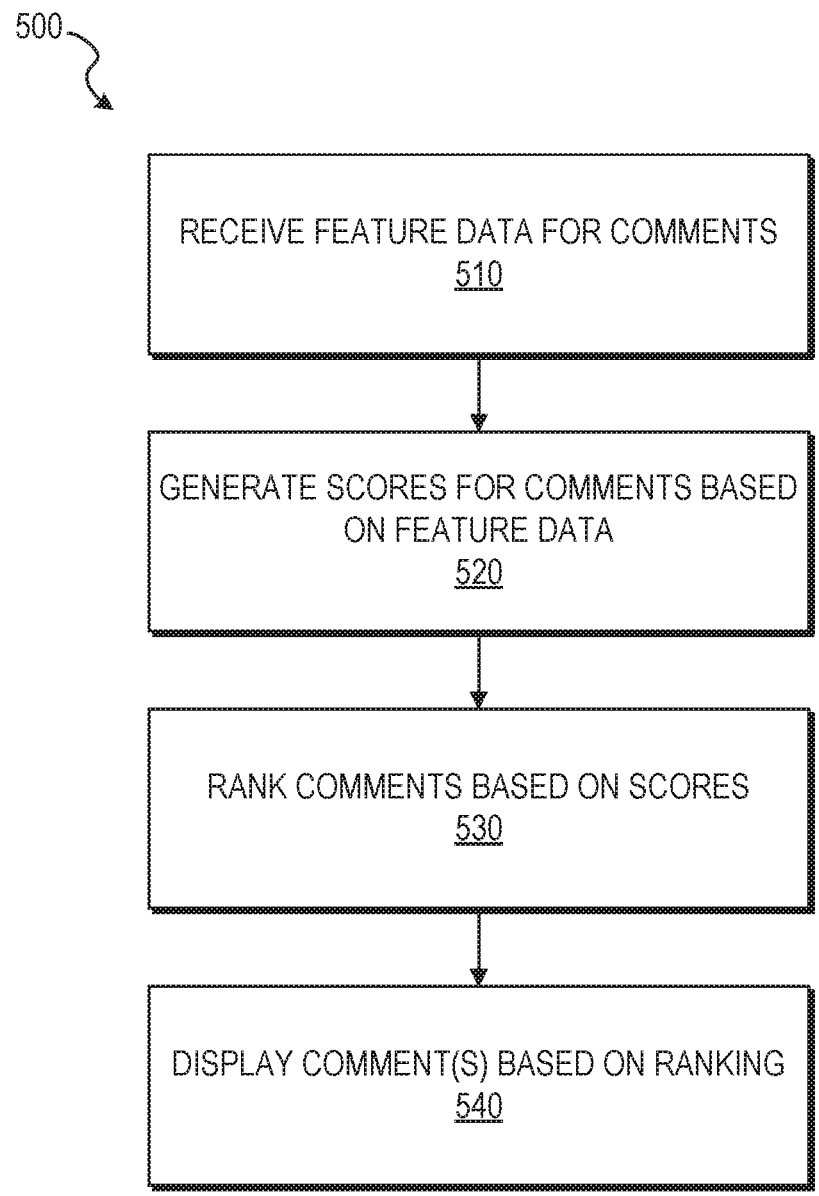
FIG. 5 is a flowchart illustrating a method of displaying one or more comments, in accordance with an example embodiment.

FIG. 5 is a flowchart illustrating a method 500 of displaying one or more comments, in accordance with an example embodiment. Method 500 can be performed by processing logic that can comprise hardware (e.g., circuitry, dedicated logic, programmable logic, microcode, etc.), software (e.g., instructions run on a processing device), or a combination thereof. In one implementation, the method 500 is performed by the comment relevance system 216 of FIGS. 2-3, or any combination of one or more of its modules, as described above.

At operation 510, for each one of a plurality of comments for an online post on a social networking service, the comment relevance system 216 (e.g., the feature data module 310) receives corresponding member feature data and at least one of corresponding comment feature data and corresponding commenter feature data, with each one of the plurality of comments having been authored by a corresponding commenter. In some example embodiments, the member feature data comprises professional identity data of a member of the social networking service, the professional identity data indicates at least one of a professional experience of the member and a professional skill of the member, the comment feature data indicates at least one attribute of the corresponding one of the plurality of comments, and the commenter feature data indicates at least one attribute of the corresponding commenter of the corresponding one of the plurality of comments. In some example embodiments, the feature data comprises any combination of one or more of the feature data disclosed herein.

At operation 520, for each one of the plurality of comments, the comment relevance system 216 (e.g., the scoring module 320) generates a corresponding score based on the corresponding member feature data and the at least one of the corresponding comment feature data and the corresponding commenter feature data. In some example embodiments, the comment relevance system 216 employs any combination of one or more of the scoring techniques disclosed herein.

In some example embodiments, prior to the generating of the corresponding scores for each one of the plurality of comments at operation 520, a joined set of features is formed, with the joined set of features including the at least one of the corresponding comment feature data and the corresponding commenter feature data, and the generating of the corresponding scores comprises generating a corresponding score based on the corresponding member feature data and the joined set of features.

At operation 530, the comment relevance system 216 (e.g., the ranking module 330) ranks the plurality of comments based on the generated scores.

At operation 540, the comment relevance system 216 (e.g., the presentation module 340) causes at least one of the plurality of comments to be displayed in a particular position in a user interface of a computing device of the member based on the ranking of the plurality of comment(s). In some example embodiments, the comment relevance system 216 causes the plurality of comments to be displayed in an order corresponding to the ranking of the plurality of comments (e.g., from the top of the user interface area used for displaying the comments to the bottom of the user interface area used for displaying the comments in descending order of level of relevancy according to the scores).

It is contemplated that any of the other features described within the present disclosure can be incorporated into method 500.

Figure 6:
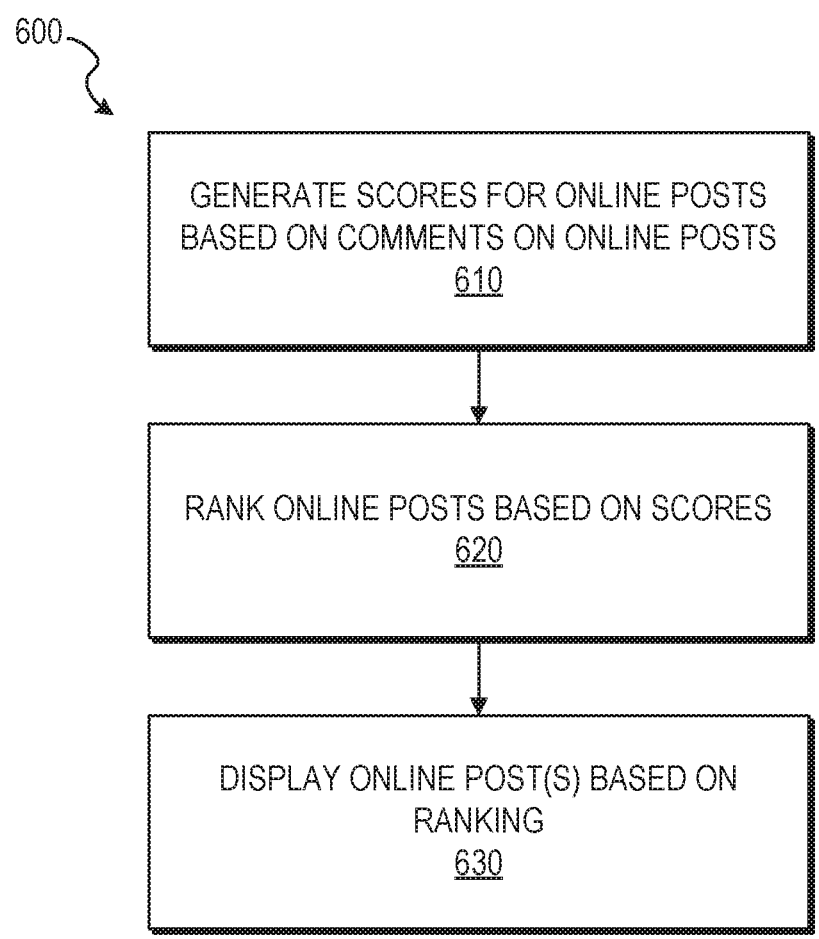
FIG. 6 is a flowchart illustrating a method of displaying one or more online posts, in accordance with an example embodiment.

FIG. 6 is a flowchart illustrating a method 600 of displaying one or more online posts, in accordance with an example embodiment. Method 600 can be performed by processing logic that can comprise hardware (e.g., circuitry, dedicated logic, programmable logic, microcode, etc.), software (e.g., instructions run on a processing device), or a combination thereof. In one implementation, the method 600 is performed by the comment relevance system 216 of FIGS. 2-3, or any combination of one or more of its modules, as described above.

At operation 610, for each one of a plurality of online posts, the comment relevance system 216 generates a corresponding score based on corresponding scores of comments of the online post. In some example embodiments, the scores of the comments of the online posts are generated using the any combination of one or more of the techniques disclosed herein. At operation 620, the comment relevance system 216 ranks the plurality of online posts based on the generated scores of the online posts. At operation 630, the comment relevance system 216 causes at least one of the plurality of online posts to be displayed in a particular position in a user interface of a computing device of a member of a social networking service based on the ranking of online post(s).

It is contemplated that any of the other features described within the present disclosure can be incorporated into method 600.

Figure 7:
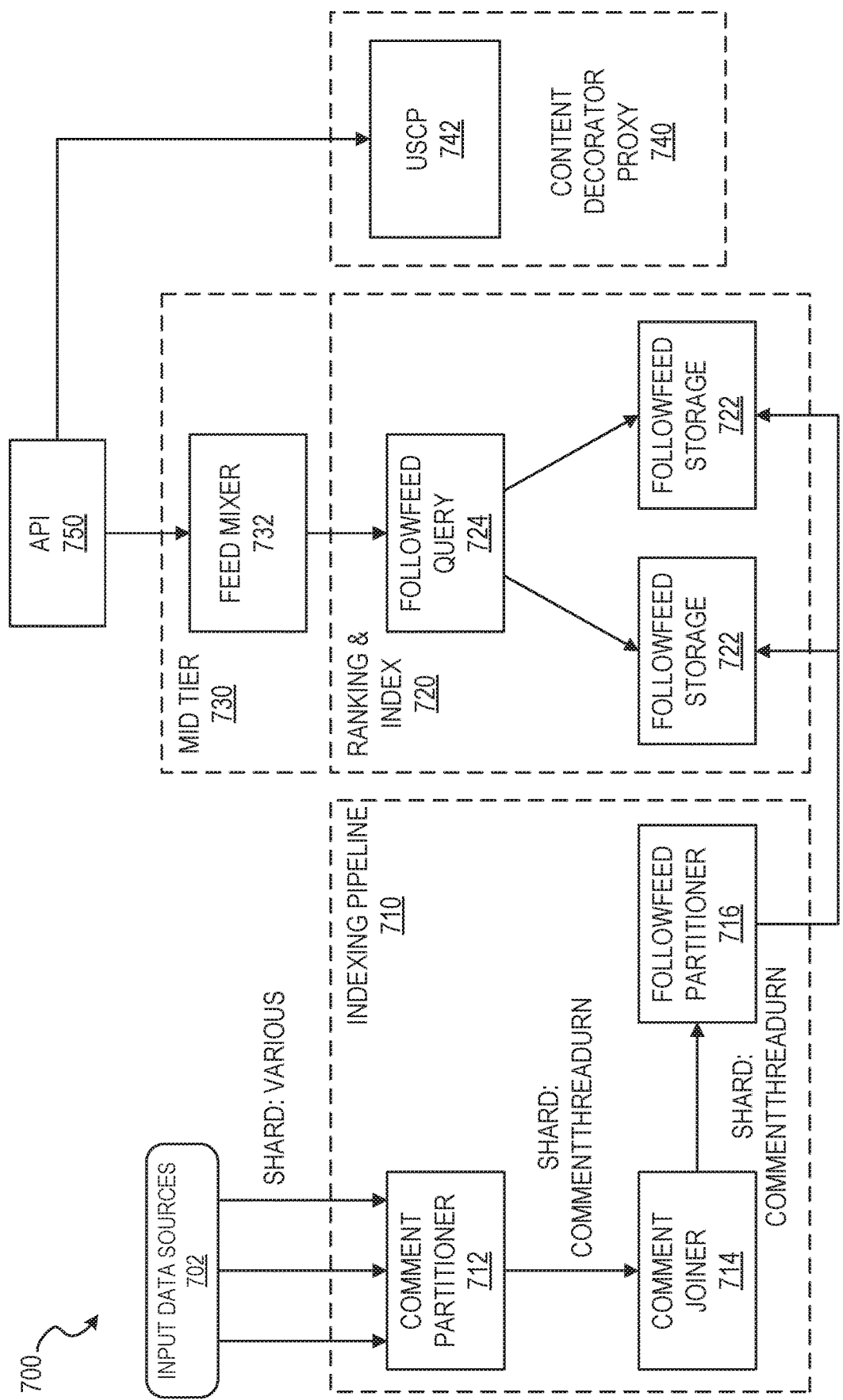
FIG. 7 is a block diagram illustrating an architecture for a comment relevance system, in accordance with an example embodiment.

FIG. 7 is a block diagram illustrating an architecture 700 for a comment relevance system 216, in accordance with an example embodiment. In some example embodiments, the architecture 700 comprises an indexing pipeline 710, a ranking and indexing layer 720, a mid-tier layer 730, a content decorator proxy layer 740, and an API 750, which may be configured to perform various communication functions to facilitate the functionality described herein, such as by communicating with the social networking system 210 via the network 104 using a wired or wireless connection. The indexing pipeline 710 transforms raw comment and like objects into followfeed storage 722 comment objects containing comment features. Every comment is attributed to a specific comment thread, and the feature data that belongs to a single comment thread is transmitted down a single pipe. The ranking and indexing layer 720 creates an inverted index over the comment data and ranks it with the aid of comment features. The mid-tier layer 730 provides viewer and context dependent features, as well as pagination support. The content decorator proxy layer 740 helps provide heavyweight object information and separates index queries from object data. In some example embodiments, the content decorator proxy layer 740 takes an identifier of a comment a decorates it with other content, such as a member name associated with the comment, images associated with the comment, a graphical indication of the number of likes of the comment, as well as other content.

In the indexing pipeline 710, a comment partitioner 712 is responsible for taking in data sources 702 sharded by various keys and standardizing the representation into a tuple, such as a (CommentThreadUrn, CommentData) tuple, essentially acting as a stateless transformation system. As used herein, CommentThreadUrn may refer to a comment thread. A comment joiner 714 acts as a stateful system that performs a Read-Update-Write loop to create a union of comment object features emitted by the comment partitioner 712. The comment joiner 714 maintains a stateful database on each host. A followfeed partitioner 716 is the last indexing stage of the indexing pipeline 710. This followfeed partitioner 716 provides standardization and fan-out distribution of indexed data to the appropriate followfeed-storage hosts 722. In some example embodiments, the followfeed partitioner 716 listens to a new stream of comment features generated by the comment joiner 714 and formats it for distribution.

In the ranking and index layer 720, the followfeed storage 722 consumes and indexes data from followfeed partitioner 716 and uses it to serve feeds. For the comment relevance system 216, a comment thread may be ranked. Ranking of a feed may involve three pieces of infrastructure: (1) a time ordered inverted index of data; (2) a scorer that ranks the entries in each posting list; and (3) features associated with entries in each posting list that enable the ranking. In one example embodiment, the posting list structure is of the form (CommentThreadUrn)=>list([Comment]), and a CommentRelevanceScorer class may be implemented for scoring the data. In this way, a comment thread may be added to a list of comments. The scorer may access the features in the EntityFeaturesStore. In some example embodiments, the ranking and index layer 720 is implemented in the comment relevance system 216.

In some example embodiments, API 750 supports mobile application and desktop interfaces for accessing a social networking service, such as the social networking service implemented on social networking system 210. API 750 may have an interface that it uses to talk to various backends to create and fetch comments. Implementations of that interface may be configured to fetch comments from an endpoint in a feed mixer 732 in the mid-tier layer 730. This fetch may be a standard Rest call. In some example embodiments, the API 750 is implemented in the application server module 214.

In the content decorator proxy layer 740, a Unified Social Content Platform (USCP) 742 looks up the comment thread and related data for any given activity, and converts them into the comment thread.

In mid-tier layer 730, the feed mixer 732 performs several calls to fetch query dependent data (QDPs), a call to /edges to fetch member connections and then a call to /followfeedRecommendations/recommend to fetch ActivityViews that represent the feed. After receiving the feed, the feed mixer 732 waits for the API 750 to call /relevantThreads with ActivityUrns, and then performs a call to USCP to convert those ActivityViews to ThreadUrns, and then subsequently calls /relevantComments on followfeed-query again to fulfil the API's /relevantThreads request.

In the ranking and index layer 720, a followfeed query 724 performs the transformation from an incoming query of the feed mixer 732 to a query that is understood by the followfeed storage 722, and aggregates and returns a top number results of results (e.g., the top 100 results) for each ThreadUrn supplied as part of the incoming requests.

In some example embodiments, the architecture 700 minimize the load on the system (e.g., on the server(s)) by using the indexing pipeline 710 to join feature data before query time (e.g., before the user for which the comments are being considered visits the page on which the comments are to be displayed), rather than performing a join of the feature data for every comment on a thread at query time.

The architecture 700 is provided as an example embodiment. It is contemplated that variations of architecture 700 as described herein may be made and still be within the scope of the present disclosure.

Example Mobile Device

Figure 8:
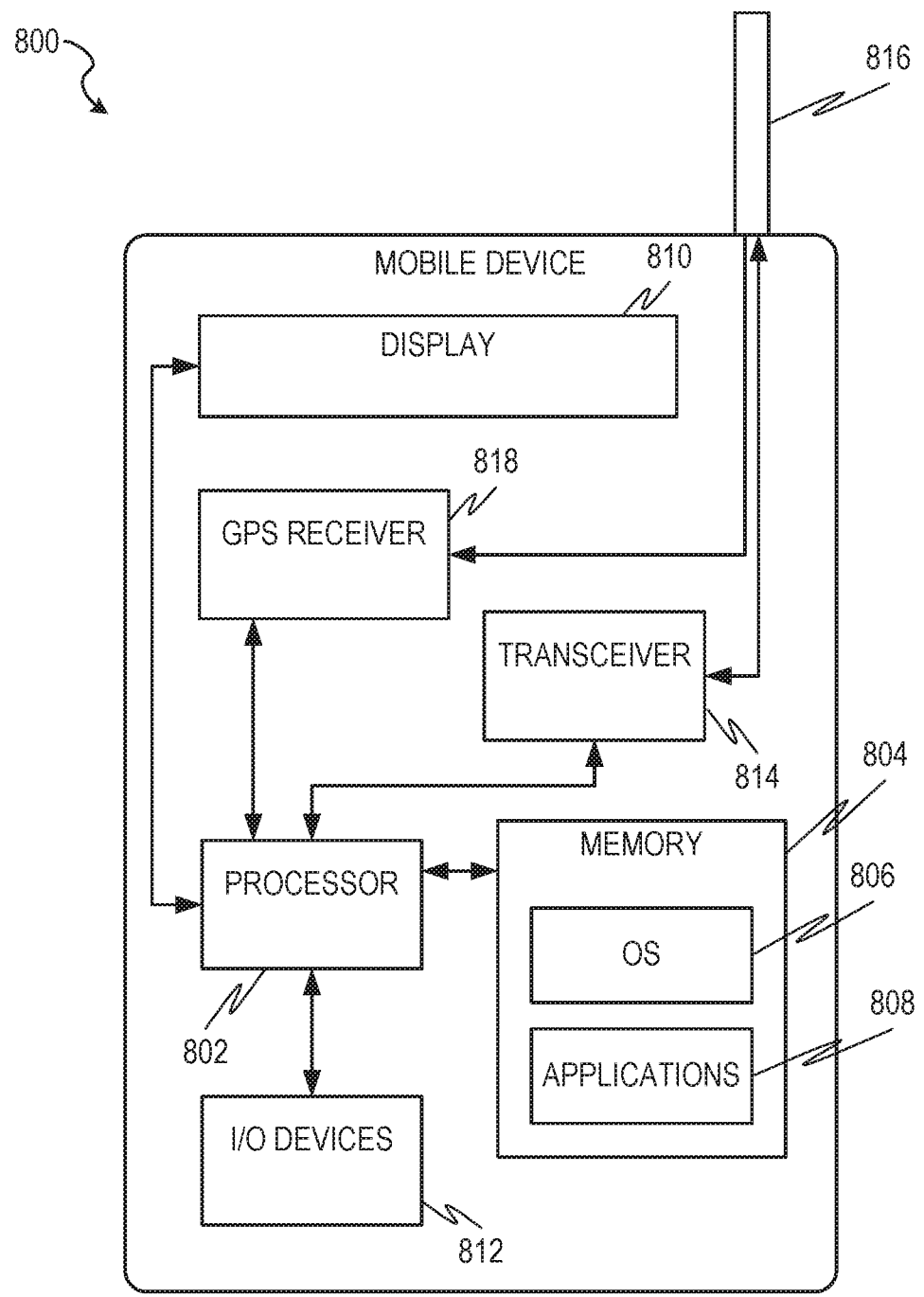
FIG. 8 is a block diagram illustrating a mobile device, in accordance with some example embodiments.

FIG. 8 is a block diagram illustrating a mobile device 800, according to an example embodiment. The mobile device 800 can include a processor 802. The processor 802 can be any of a variety of different types of commercially available processors suitable for mobile devices 800 (for example, an XScale architecture microprocessor, a Microprocessor without Interlocked Pipeline Stages (MIPS) architecture processor, or another type of processor). A memory 804, such as a random access memory (RAM), a Flash memory, or other type of memory, is typically accessible to the processor 802. The memory 804 can be adapted to store an operating system (OS) 806, as well as application programs 808, such as a mobile location-enabled application that can provide location-based services (LBSs) to a user. The processor 802 can be coupled, either directly or via appropriate intermediary hardware, to a display 810 and to one or more input/output (I/O) devices 812, such as a keypad, a touch panel sensor, a microphone, and the like. Similarly, in some embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a GPS receiver 818 can also make use of the antenna 816 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
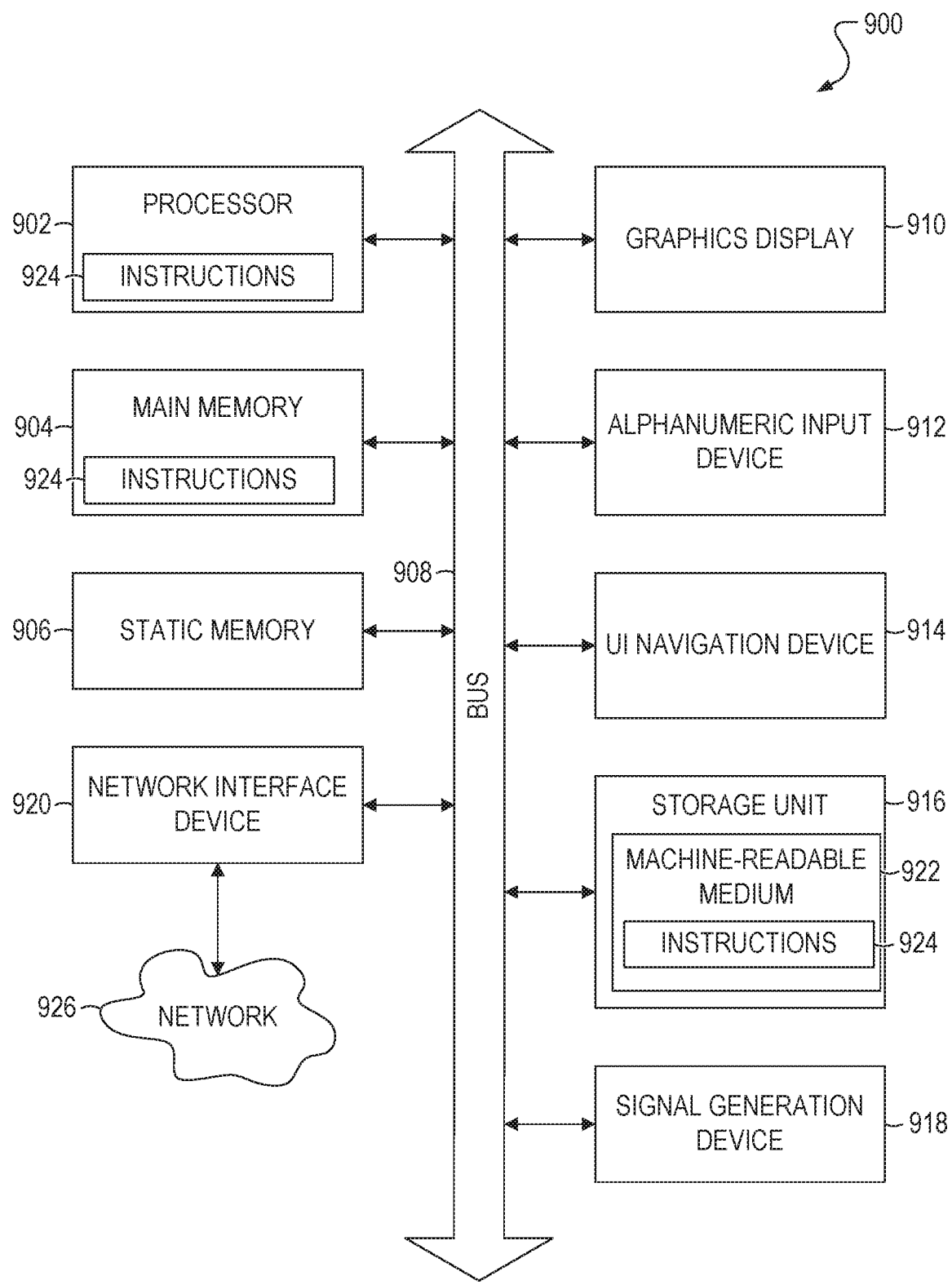
FIG. 9 is a block diagram of an example computer system on which methodologies described herein may be executed, in accordance with an example embodiment.

FIG. 9 is a block diagram of an example computer system 900 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a graphics display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation device 914 (e.g., a mouse), a storage unit 916, a signal generation device 918 (e.g., a speaker) and a network interface device 920.

Machine-Readable Medium

The storage unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions (e.g., instructions 924) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:

for each one of a plurality of user-generated content for an online post on a social networking service, receiving, by at least one hardware processor, corresponding member feature data and corresponding comment feature data, each one of the plurality of user-generated content having been authored by a corresponding commenter, the member feature data comprising professional identity data of a member of the social networking service and indicating at least one of a professional experience of the member and a professional skill of the member, the corresponding comment feature data comprising a length of the corresponding one of the plurality of user-generated content;

for each one of the plurality of-user-generated content, forming a joined set of features including the corresponding comment feature data;

for each one of the plurality of user-generated content, generating, by the at least one hardware processor, a corresponding score based on the corresponding member feature data and the joined set of features, the joined set of features on which the generating of the corresponding score is based including the length of the corresponding user-generated content, the generating of the corresponding score comprises applying a minimum length threshold or applying a maximum length threshold, the applying of the minimum length threshold comprising decreasing the corresponding score based on the corresponding user-generated content having fewer than a minimum number of words, and the applying of the maximum length threshold comprising decreasing the corresponding score based on the corresponding user-generated content having more than a maximum number of words;

ranking, by the at least one hardware processor, the plurality of user-generated content based on the generated scores; and causing, by the at least one hardware processor, at least one of the plurality of user-generated content to be displayed in a position in a user interface of a computing device of the member based on the ranking of the at least one of the plurality of user-generated content, the position in which the at least one of the plurality of user-generated content is displayed being determined based on, at least in part, the corresponding length of the at least one of the plurality of user-generated content.

2. The computer-implemented method of claim 1, wherein causing the at least one of the plurality of user-generated content to be displayed in a position comprises causing the plurality of user-generated content to be displayed in an order corresponding to the ranking of the plurality of user-generated content.

3. The computer-implemented method of claim 1, wherein the generating of the corresponding score for each one of the plurality of user-generated content is further based on corresponding commenter feature data, the corresponding commenter feature data comprising professional identity data of the corresponding commenter of the one of the plurality of user-generated content, and the corresponding score for each one of the plurality of user-generated content is generated based on a level of similarity between the professional identity data of the member and professional identity data of the corresponding commenter of the one of the plurality of user-generated content.

4. The computer-implemented method of claim 1, wherein the corresponding comment feature data further comprising at least one word in the corresponding one of the plurality of user-generated content, and the generating the corresponding score for each one of the plurality of user-generated content comprises:
for each one of the plurality of user-generated content, determining a corresponding level of relevancy of the corresponding one of the plurality of user-generated content to the professional identity data of the member based on the at least one word in the corresponding one of the plurality of user-generated content; and
for each one of the plurality of user-generated content, generating the corresponding score based on the determined corresponding level of relevancy of the corresponding one of the plurality of user-generated content.

5. The computer-implemented method of claim 1, wherein the plurality of user-generated content comprises a plurality of comments.

6. The computer-implemented method of claim 1, wherein the generating of the corresponding score for each one of the plurality of user-generated content is further based on corresponding commenter feature data comprising a number of user selections to view the corresponding one of the plurality of user-generated content.

7. The computer-implemented method of claim 1, wherein the generating of the corresponding score for each one of the plurality of user-generated content is further based on corresponding commenter feature data comprising a level of network relationship between the member and the corresponding commenter of the corresponding one of the plurality of user-generated content.

8. The computer-implemented method of claim 1, wherein the corresponding comment feature data comprising a number of explicit user responses to the corresponding one of the plurality of user-generated content.

9. The computer-implemented method of claim 1, wherein the generating of corresponding score for each one of the plurality of user-generated content is further based on corresponding commenter feature data comprising a status of the corresponding commenter of the corresponding one of the plurality of user-generated content.

10. The computer-implemented method of claim 1, wherein the generating of corresponding score for each one of the plurality of user-generated content is further based on corresponding commenter feature data comprising an indication of popularity of the corresponding commenter of the corresponding one of the plurality of user-generated content.

11. The computer-implemented method of claim 1, wherein the at least one of the corresponding comment feature data and corresponding commenter feature data comprises the corresponding commenter feature data, the generating of corresponding score for each one of the plurality of user-generated content is further based on corresponding commenter feature data comprising a level of interaction on the social networking service between the member and the corresponding commenter of the corresponding one of the plurality of user-generated content.

12. The computer-implemented method of claim 1, wherein the generating the corresponding score comprises calculating the corresponding score using a corresponding weight for each one of the corresponding member feature data and the corresponding comment feature data.

13. The computer-implemented method of claim 1, further comprising:
causing a selectable user interface element to be displayed in association with the online post in the user interface of the computing device; and
receiving a user selection of the selectable user interface element, the user selection indicating a request that the plurality of user-generated content be sorted and displayed according to relevance,
wherein the causing the at least one of the plurality of user-generated content to be displayed in a position in a user interface of a computing device of the member based on the ranking of the at least one of the plurality of user-generated content is performed based on the receiving of the user selection.

14. The computer-implemented method of claim 1, further comprising:
for each one of a plurality of online posts, generating a corresponding score based on corresponding scores of user-generated content of the online post, the plurality of online posts comprising the online post;
ranking the plurality of online posts based on the generated scores of the online posts; and
causing at least one of the plurality of online posts to be displayed in a position in the user interface of the computing device of the member based on the ranking of the at least one of the plurality of online posts.

15. The computer-implemented method of claim 1, further comprising:
analyzing content of the plurality of user-generated content;
determining that the content of one of the plurality of user-generated content belongs to one of a plurality of classifications based on the analysis of the content of the plurality of user-generated content; and
preventing the one of the plurality of user-generated content from being displayed based on the determining that the content of the one of the plurality of user-generated content belongs to the one of the plurality of classification.

16. A system comprising:
at least one processor; and
a non-transitory machine-readable medium embodying a set of instructions that, when executed by the at least one processor, cause the at least one processor to perform operations, the operations comprising:
for each one of a plurality of user-generated content for an online post on a social networking service, receiving corresponding member feature data and corresponding comment feature data, each one of the plurality of user-generated content having been authored by a corresponding commenter, the member feature data comprising professional identity data of a member of the social networking service and indicating at least one of a professional experience of the member and a professional skill of the member, the corresponding comment feature data comprising a length of the corresponding one of the plurality of user-generated content;

for each one of the plurality of user-generated content, generating a corresponding score based on the corresponding member feature data and the corresponding comment feature data, the corresponding comment feature data on which the generating of the corresponding score is based including the length of the corresponding user-generated content, the generating of the corresponding score comprises applying a minimum length threshold or applying a maximum length threshold, the applying of the minimum length threshold comprising decreasing the corresponding score based on the corresponding user-generated content having fewer than a minimum number of words, and the applying of the maximum length threshold comprising decreasing the corresponding score based on the corresponding user-generated content having more than a maximum number of words;

ranking the plurality of user-generated content based on the generated scores; and causing at least one of the plurality of user-generated content to be displayed in a position in a user interface of a computing device of the member based on the ranking of the at least one of the plurality of user-generated content, the position in which the at least one of the plurality of user-generated content is displayed being determined based on, at least in part, the corresponding length of the at least one of the plurality of user-generated content.

17. The system of claim 16, wherein causing the at least one of the plurality of user-generated content to be displayed in a position comprises causing the plurality of user-generated content to be displayed in an order corresponding to the ranking of the plurality of user-generated content.

18. The system of claim 16, wherein the generating of the corresponding score for each one of the plurality of user-generated content is further based on corresponding commenter feature data comprising professional identity data of the corresponding commenter of the one of the plurality of user-generated content, and the corresponding score for each one of the plurality of user-generated content is generated based on a level of similarity between the professional identity data of the member and professional identity data of the corresponding commenter of the one of the plurality of user-generated content.

19. A non-transitory machine-readable medium embodying a set of instructions that, when executed by a processor, cause the processor to perform operations, the operations comprising:

for each one of a plurality of user-generated content for an online post on a social networking service, receiving corresponding member feature data and corresponding comment feature data, each one of the plurality of user-generated content having been authored by a corresponding commenter, the member feature data comprising professional identity data of a member of the social networking service and indicating at least one of a professional experience of the member and a professional skill of the member, the corresponding comment feature data comprising a length of the corresponding one of the plurality of user-generated content;

for each one of the plurality of user-generated content, generating a corresponding score based on the corresponding member feature data and the corresponding comment feature data, the joined set of features on which the generating of the corresponding score is based including the length of the corresponding user-generated content, the generating of the corresponding score comprises applying a minimum length threshold or applying a maximum length threshold, the applying of the minimum length threshold comprising decreasing the corresponding score based on the corresponding user-generated content having fewer than a minimum number of words, and the applying of the maximum length threshold comprising decreasing the corresponding score based on the corresponding user-generated content having more than a maximum number of words;

ranking the plurality of user-generated content based on the generated scores; and causing at least one of the plurality of user-generated content to be displayed in a position in a user interface of a computing device of the member based on the ranking of the at least one of the plurality of user-generated content, the position in which the at least one of the plurality of user-generated content is displayed being determined based on, at least in part, the corresponding length of the at least one of the plurality of user-generated content.

* * * * *

UNITED STATES PATENT AND TRADEMARK OFFICE
CERTIFICATE OF CORRECTION

PATENT NO. : 10,771,424 B2
APPLICATION NO. : 15/483968
DATED : September 8, 2020
INVENTOR(S) : Kapoor et al.

Page 1 of 1

It is certified that error appears in the above-identified patent and that said Letters Patent is hereby corrected as shown below:

On the Title Page

Item (72), in "Inventors", in Column 1, Line 6, delete "Sunnyvale," and insert --Milpitas,-- therefor In the Claims In Column 24, Lines 4-6, in Claim 11, after "wherein", delete "the at least one of the corresponding comment feature data and corresponding commenter feature data comprises the corresponding commenter feature data,"

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*